(No Model.) 3 Sheets—Sheet 1.
J. D. IHLDER.
COMPOUND BRAKE FOR ELECTRIC ELEVATORS.
No. 596,513. Patented Jan. 4, 1898.

Witnesses
Inventor
John D. Ihlder
Attorneys (No Model.) 3 Sheets—Sheet 2.

J. D. IHLDER.
COMPOUND BRAKE FOR ELECTRIC ELEVATORS.

No. 596,513. Patented Jan. 4, 1898.

Witnesses

Inventor
John D. Ihlder
Attorney (No Model.) 3 Sheets—Sheet 3.
J. D. IHLDER.
COMPOUND BRAKE FOR ELECTRIC ELEVATORS.
No. 596,513. Patented Jan. 4, 1898.
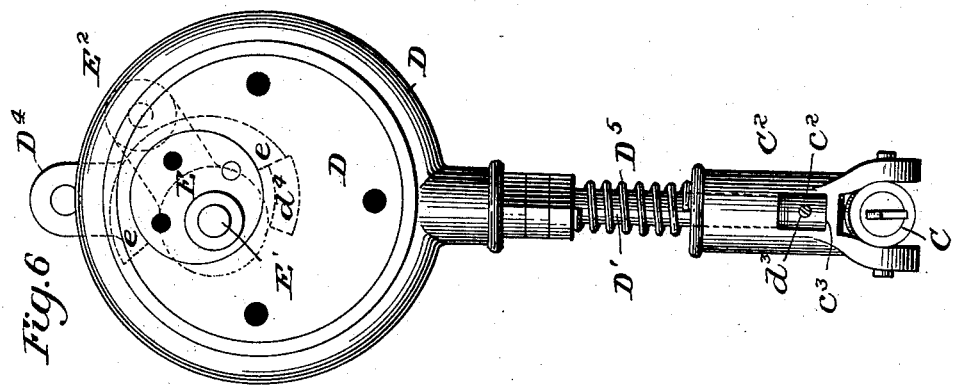
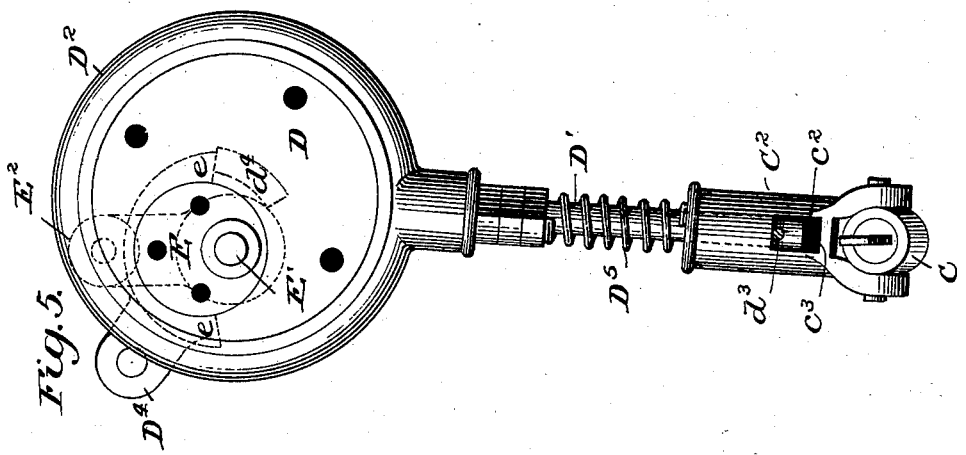
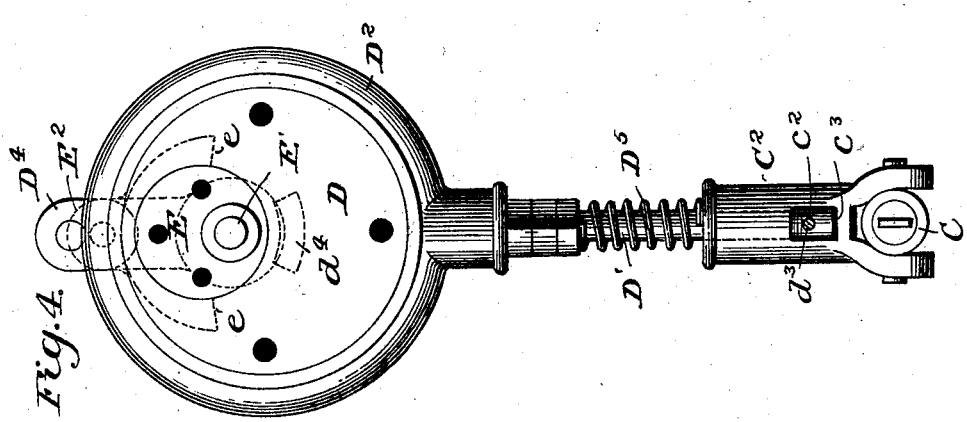

UNITED STATES PATENT OFFICE.

JOHN D. IHLDER, OF YONKERS, NEW YORK, ASSIGNOR TO THE OTIS BROTHERS & COMPANY, OF NEW YORK, N. Y.

COMPOUND BRAKE FOR ELECTRIC ELEVATORS.

SPECIFICATION forming part of Letters Patent No. 596,513, dated January 4, 1898.

Application filed September 14, 1896. Serial No. 605,783. (No model.)

*To all whom it may concern:*

Be it known that I, JOHN D. IHLDER, a citizen of the United States, residing at Yonkers, in the county of Westchester and State of New York, have invented certain new and useful Improvements in Compound Brakes for Electric Elevators, of which the following is a specification.

My invention relates to compound brake devices for electric elevators, and while it is intended to be used with and is shown as adapted to an electric elevator it will readily be understood that it can be used in connection with other elevators and other apparatus by those skilled in the art without departing from the spirit of my invention.

The object of my invention is to provide a brake apparatus for elevators and the like so constructed and arranged that when used in the ordinary operations at intermediate landings or otherwise it will apply a certain amount of pressure to the brake, which is preferably elastic or yielding, but sufficient to control the motions of the elevator, while under other conditions, as in case of emergency or when the cage arrives at the limit of its movement, a greater, more forcible, and direct action is imparted to the brake, which will insure absolute stopping of the apparatus; and with this general purpose and object in view my invention consists in a brake apparatus constructed and arranged to accomplish these purposes and operating in a manner substantially as hereinafter pointed out.

Figure 1:
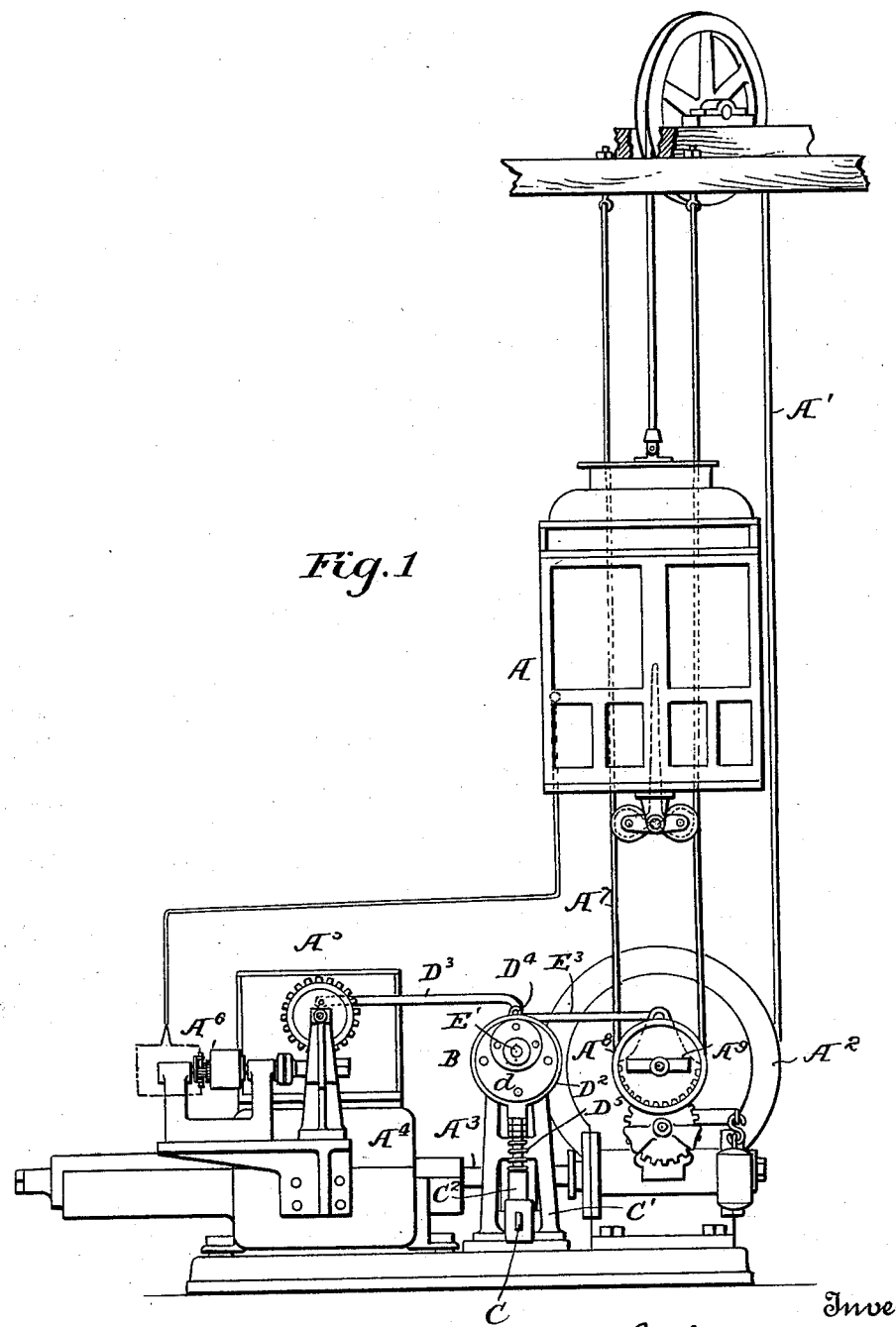
Figure 2:
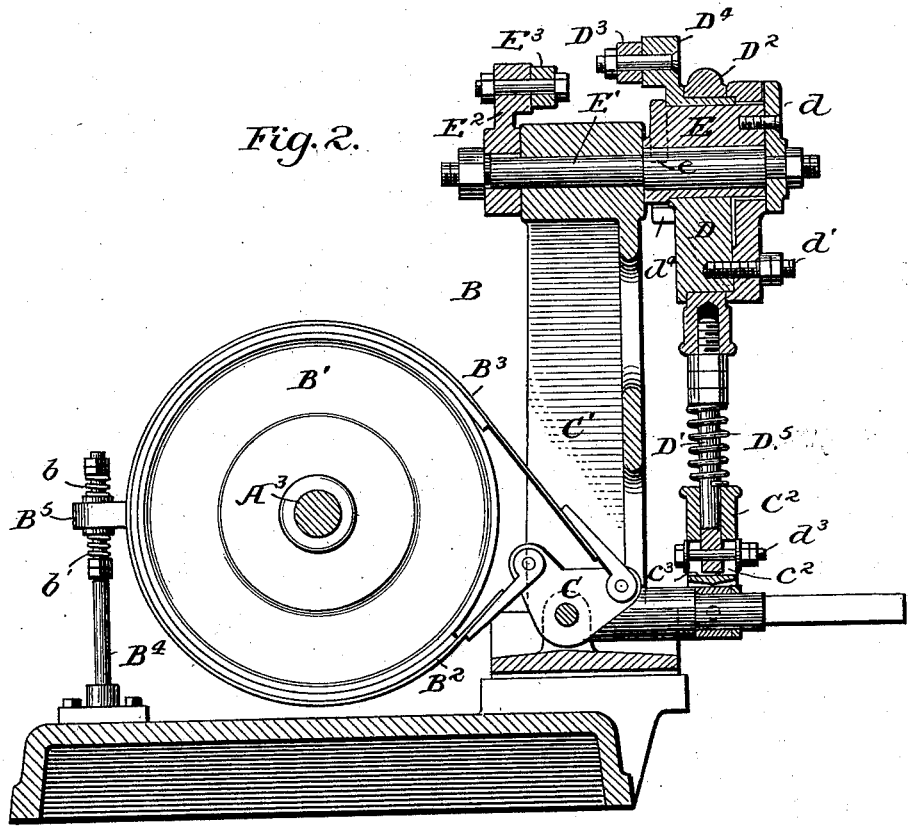
Figure 3:
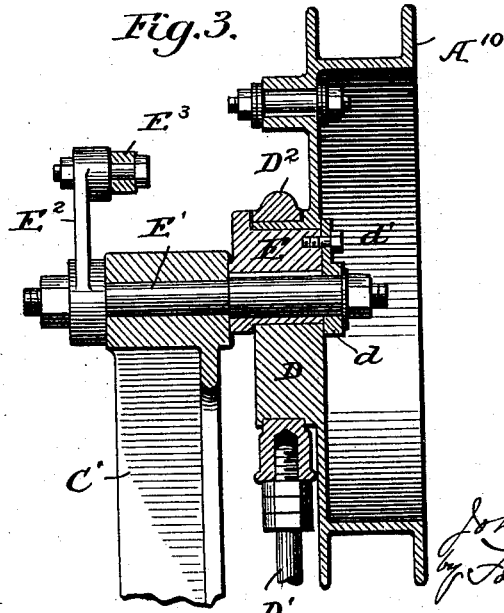

Referring to the accompanying drawings, Figure 1 is an elevation showing the general arrangement of an electric elevator apparatus and indicating the general relation of the brake device and means for operating it. Fig. 2 is an enlarged transverse section of sufficient of a brake apparatus to illustrate my improvement. Fig. 3 is a similar view showing another arrangement of the shifting devices in connection with the brake apparatus. Figs. 4, 5, and 6 are detached views showing the movements of the eccentrics in various positions.

As above stated, while my invention may be applied to many and various forms of devices where a brake is needed, it is especially applicable to elevators, and I have shown it in connection with electric elevators, and in Fig. 1 I have shown a general arrangement of such elevators wherein the cage A is connected to the hoisting-rope A', passing around the drum $A^2$, which is driven in this instance by a shaft $A^3$, operated by an electric motor $A^4$, controlled by a switch device $A^5$, which may be operated by a pilot-motor $A^6$, controlled by the electric circuit on the car or by the ordinary hand-ropes $A^7$, connected to a sheave $A^8$, or in any other suitable manner. Connected to the drum $A^2$ is an ordinary automatic stop device $A^9$, the construction of which need not be specifically described, though I prefer the construction described in my Letters Patent No. 558,075, and which operates automatically to stop the motor as the car reaches the extremes of its limit at the top or bottom of the well, and in the present instance I also connect the brake device with this automatic stop device when I use the direct positively-actuated brake in addition to the compression-brake, as hereinafter set forth. The brake device B in this instance is located between the drum and motor, and it is understood that in this construction when the motor is stationary the brake is applied and must be released before the motor can start. This is usually done by connecting the brake device with the starting device of the motor, and in the present instance it is connected with the switch device $A^5$, or vice versa. The switch device is connected with the brake device when the same is operated by the hand-rope $A^7$, as indicated in Fig. 3.

Referring more particularly to Fig. 2, B' is a brake-wheel on the shaft $A^3$, and there is some suitable braking device connected with the wheel, shown in the present instance as consisting of two brake-bands $B^2$ $B^3$, supported in the presence instance on a standard $B^4$, having springs $b$ $b'$ on opposite sides of a lug $B^5$, to which the bands are connected. The free ends of the bands are connected to a lever C, arranged on the frame of the machine and arranged so that as the lever is moved the bands are tightened or released around the brake-wheel B'. This lever is mounted at the base of the standard C', which supports the operating mechanism of the brake. On this brake-lever is mounted a socket $C^2$, in which moves a rod $D'$, connected to a strap $D^2$, mounted upon an eccentric $D$. This eccentric is supported on a shaft $E'$ in the standard $C'$, and is connected by a rod $D^3$, attached to a projection $D^4$, with the switch mechanism $A^5$, so that the eccentric D moves with the switch mechanism. The strap $D^2$ is held in position on the eccentric D by any suitable means, as the face-plate $d$ and screws $d'$, and interposed between the strap $D^2$ and the socket $C^2$ is a spring $D^5$. The end of the rod $D'$ is provided with a pin $d^3$, moving in slot $c^2$ in the socket $C^2$.

With the construction so far described it will be seen that the brake device operates as a spring-compression brake device, and that in the normal position shown in Fig. 2 the brake is applied under pressure, the spring $D^5$ being compressed more or less, forming an elastic and at the same time substantial grip on the brake-wheel. When the starting mechanism is operated by any suitable means, the eccentric D is also moved, raising the strap $D^2$, releasing the pressure on the spring $D^5$, and as the rod $D'$ moves upward the pin $d^3$, acting upon the upper wall of the slot $c^2$, lifts the socket and lever, releasing the brake; but when the stopping device is operated the eccentric is turned through the medium of the rod $D^3$ to its normal position, forcing the strap $D^2$ down, applying the lever, and then putting the lever under the tension of the spring $D^5$. In some cases I have found it satisfactory to use simply this construction as a spring-compression brake, especially in relatively small or slow-running elevators; but in larger or faster-running elevators it is desirable to have a direct positively acting brake.

By the use of the words "spring-compression brake" I mean a brake and connecting mechanism whereby the brake is held under the tension of a spring, and by the use of the words "direct positively acting brake" I mean a brake and connecting actuating mechanism whereby the brake acts directly and positively and does not depend upon the compression of a spring. In the apparatus shown the brake can be used first as a spring-compression brake, in which the brake is under the tension of a spring, and the same brake can be further operated to act directly and positively and is not dependent upon the resiliency of the spring. Further, this spring-compression brake thus far described is usually sufficient to control the movements of the elevator at the intermediate landings; but at the top and bottom of the shaft it is desirable to have a more direct positively acting brake, and I will now describe the manner of applying such brake to this compression-brake illustrated herein.

The shaft $E'$ is provided with an eccentric E, which is rigidly mounted on the shaft and forms a bearing for the eccentric D. Connected to a projection $E^2$ on the shaft $E'$ is a rod $E^3$, which is connected to the automatic stop device $A^9$. This eccentric E operates in connection with the eccentric D to apply the brake more forcibly when it is moved by the automatic stop device, and the eccentric E is provided with lugs $e$, arranged to engage with a lug or projection $d^4$ on the eccentric D.

In the arrangement shown in Fig. 3 the construction is substantially the same, except that there is a sheave $A^{10}$ mounted on the shaft $E'$, and in this way the eccentric D is operated directly by said sheave, and the switch is operated therefrom instead of the eccentric being operated from the switch.

Such being the preferred construction and arrangement of parts, (although, of course, other equivalent constructions can be used,) I will now proceed to describe the mode of operation, referring more particularly to Figs. 4, 5, and 6, which show face views of the eccentrics.

Assuming the elevator to be stationary, the parts are in the relative position shown in Fig. 4, with the brake applied, the spring $D^5$ being compressed and the parts acting as a compression-brake. When the motor is started, the rod $D^3$ is moved to the right or left to cause the elevator to go up or down, and the eccentric D is rotated on its bearing, which in this instance is the eccentric E, and the parts assume the position shown in Fig. 5, wherein the rod $D'$ is raised, releasing the pressure on the spring $D^5$, and the pin $d^3$ has engaged the upper portion of the slot $c^2$, raising the lever C, releasing the brake-bands, and the elevator travels to the desired destination, when the operator moves the rod $D^3$ to its normal position, which of course restores the eccentric D to the position shown in Fig. 4, applying the brake as before.

Under ordinary operations of the elevator this brake is sufficient; but if the elevator is moving rapidly it may be necessary or desirable to apply greater braking power to properly stop the elevator, and I provide what may be called an "emergency-brake," by means of which the operator can apply a direct positive-acting brake to the engine. Again, it is generally desirable to apply greater braking power to the motor as the car reaches the extremes of its limit at the top or bottom of the well, and this I provide for by means of the direct positive-acting brake being arranged and connected to be operated automatically, as by the automatic stop device of the engine. Furthermore, if perchance the operator should fail to apply the brake as the car reaches the limits of its movement it is desirable that the brake should be automatically and positively applied, and this is provided for by arranging the parts so that the automatic stop device will apply the brake and apply it more forcibly than in an ordinary stop. Thus, as shown, the automatic stop device $A^9$ is arranged to move the rod $E^3$ to its normal position (shown in Fig. 1) when the car reaches the extremes of its movement at top or bottom, and, furthermore, in order to provide the emergency-brake the rod $E^3$ is connected to be operated by the sheave $A^8$, which is shown as being operated by the hand-rope $A^7$ from the car. With this construction it will be seen that when the rod $E^3$ is operated it turns the eccentric E on the shaft $E'$, as seen in Fig. 6. If the operator has previously applied the spring-compression brake, the effect of the movement of the eccentric E is to force the eccentric D down farther, applying more pressure to the brake. If, however, the operator has failed to set the compression-brake, moving the rod $E^3$ will operate the eccentric E, and this, by means of the lugs $e$ coming in contact with the lug $d^4$, will turn the eccentric D to its normal position and the parts will assume the relations shown in Fig. 6, in which it will be seen that the spring $D^5$ is more compressed, thereby applying greater pressure to the brake-lever, and, further, I prefer to arrange the rod $D'$ so that under these conditions it will bear positively upon the base $c^3$ of the socket $C^2$, forming a positive bearing thereon, and consequently more positive action of the brake, which will insure the immediate stopping of the car.

It will be seen that the eccentric E and its connecting-rod $E^3$ can be operated from the car by the hand-ropes $A^7$ when connected to sheave $A^8$, so that in case of emergency the operator can apply both the spring-compression and direct positively-acting brakes and bring the car to a state of rest. Sometimes, however, it is not deemed necessary to provide the intermediate emergency-brake, and in that case the hand-rope $A^7$ is connected to the sheave $A^{10}$ in Fig. 3 and the pilot-motor $A^6$ is dispensed with; or either the hand-rope $A^7$, connected to the sheave $A^{10}$, or the pilot-motor $A^6$ may be used, and the emergency or direct positively-acting brake be applied only by the automatic stop devices as the car reaches the top or bottom of its travel.

If it is desired to start the elevator in the reverse direction after the emergency or direct positively-acting brake has been applied, turning the eccentric D by the hand-rope or otherwise will release the brake, and in order to insure this action I preferably arrange the relations of the eccentrics so that the eccentric D will move the brake-lever considerably more than the eccentric E when acting alone.

From the above description the general principles of my invention will be understood by those skilled in the art, and it will be seen that these may be applied and used with various constructions or details of mechanism, so that my invention is not limited to the construction shown and described, but includes equivalent forms of mechanism, and it will further be seen that my invention can be used in whole or in part or in combination with other equivalent constructions.

What I claim is—

1. The combination with the brake of an elevator-engine, of a spring-compression device connected with the brake, a direct positively-acting device also connected with the brake, and means for operating both devices to apply the brake in the manner and for the purpose described.

2. The combination with the brake of an elevator-engine, of a spring-compression device connected with the brake, a direct positively-acting device also connected with the brake, means for operating the spring-compression device independent of the direct positively-acting device, and means for operating the direct positively-acting device whereby the spring-compression device may be operated to apply the brake, or both the spring-compression device and direct positively-acting device may be operated to apply the brake, substantially as described.

3. The combination with the brake device of an elevator-engine, of an eccentric, connections with the eccentric whereby it can be controlled by the operator, a strap mounted on the eccentric, a rod connected to the strap, a socket mounted on the brake device, and a spring interposed between the strap and socket, substantially as described.

4. The combination with the brake device of an elevator-engine, of an eccentric, connections with the eccentric whereby it can be controlled by the operator, a strap mounted on the eccentric, a socket provided with a slot connected to the brake device, a rod connected to the strap and entering the socket, a pin in the rod, and a spring interposed between the socket and strap, substantially as described.

5. The combination with the automatic stop-motion device and the brake device of an elevator-engine, of two eccentrics, connections between the eccentrics and brake device, connections with one of the eccentrics whereby it can be controlled by the operator, and connections with the other eccentric whereby it is controlled by the automatic stop-motion device, substantially as described.

6. The combination with the automatic stop-motion device and the brake device of an elevator-engine, of means under the control of the operator for applying the brake, and means connected with the automatic stop device for applying additional power to the brake, substantially as described.

7. The combination with the brake device of an elevator-engine, of a shaft, two eccentrics supported by said shaft, means for operating the eccentrics independently, and connections between the eccentrics and the brake device, substantially as described.

8. The combination with the automatic stop-motion device and the brake device of an elevator-engine, of a shaft, an eccentric rigidly mounted thereon, connections between the shaft and the automatic stop device of the elevator-engine, a second eccentric mounted on the first eccentric, connections between the second eccentric and the starting and stopping mechanism of the engine, and connections between the eccentrics and brake device, substantially as described.

9. The combination with the brake device of an elevator-engine, of a shaft, an eccentric mounted thereon, connections between the shaft and the automatic stop device of the elevator-engine, a second eccentric mounted on the first eccentric, connections between the second eccentric and the starting and stopping mechanism of the engine, a strap mounted on said eccentric, elastic connections between the strap and the brake, and means whereby when both eccentrics are operated a positive movement is applied to the brake, substantially as described.

In testimony whereof I have signed my name to this specification in the presence of two subscribing witnesses.

JOHN D. IHLDER.

Witnesses:
   WM. P. CONSTABLE,
   H. BEATTIE BROWN.